United States Patent [19]

Kaneda

[11] Patent Number: 4,581,653
[45] Date of Patent: Apr. 8, 1986

[54] IMAGE PICK-UP DEVICE

[75] Inventor: Naoya Kaneda, Kanagawa, Japan

[73] Assignee: Canon Kabushiki Kaisha, Tokyo, Japan

[21] Appl. No.: 489,851

[22] Filed: Apr. 29, 1983

[30] Foreign Application Priority Data

May 12, 1982 [JP] Japan .................. 57-79639

[51] Int. Cl.⁴ ............................................ H04N 5/232
[52] U.S. Cl. ..................................... 358/227; 358/224
[58] Field of Search ............... 358/227, 224, 105, 107, 358/108; 354/402, 403, 400, 407

[56] References Cited

U.S. PATENT DOCUMENTS

| | | | |
|---|---|---|---|
| 2,347,933 | 5/1944 | Campbell | 358/224 |
| 3,652,784 | 3/1972 | Wupper et al. | 358/227 |
| 4,251,143 | 2/1981 | Stemme et al. | 354/407 |
| 4,259,688 | 3/1981 | Tokuhara et al. | 358/108 |
| 4,400,743 | 8/1983 | Takimoto et al. | 358/335 |
| 4,415,937 | 11/1983 | Nishizawa et al. | 358/213 |

Primary Examiner—Gene Z. Rubinson
Assistant Examiner—Stephen Brinich
Attorney, Agent, or Firm—Toren, McGeady, Stanger, Goldberg & Kiel

[57] ABSTRACT

Disclosed is an image pick-up device which includes focus adjustable image forming lens apparatus for forming an object image; image pick-up apparatus to receive the object image formed by the lens apparatus and to produce an electrical signal indicative of the picked up image. The device also includes image signal handling apparatus receptive to the signal produced by the pick-up apparatus; focus detecting or adjusting apparatus receptive to the signal produced by the pick-up apparatus and detecting the focusing condition of the lens apparatus on the basis of the received signal. The device also includes control apparatus for alternatively operating the focus detecting or adjusting apparatus and the signal handling apparatus.

22 Claims, 8 Drawing Figures

IMAGE PICK-UP DEVICE

BACKGROUND OF THE INVENTION

1. Field of the Invention

This invention generally relates to an image pick-up device and more particularly to an image pick-up device provided with image pick-up means to produce an electrical image pick-up signal and focus detecting or adjusting means to detect or adjust the focal point of an imaging lens system by virtue of the image pick-up means.

2. Description of the Prior Art

Focus detecting or adjusting devices, especially automatic focusing devices, have rapidly become popular, since being adopted for photographic film cameras. They are now in broad use for various cameras including 35 mm lens-shutter cameras, video cameras, 8 mm cameras, etc. Furthermore, the distance measuring method employed in these devices has proliferated into many different methods. These distance measuring methods, for example, include a method in which sound waves are emitted at an object to be photographed and the distance to the object is measured by finding a time difference between sound wave emission and return after they impinge on the object and bounce back. One method uses a detection circuit which produces a characteristic output when an image formed by an objective lens system becomes most sharp on a predetermined focal plane and another method is based on the principle of trigonometrical measurement. Of these methods, the trigonometrical distance measuring method is roughly divided into an active type in which a light, such as near infrared rays or the like, is projected on the object and a passive type in which a light emitted from the object is utilized.

The conventional technique, however, necessitates provision of an image pick-up element and a focus detection element even in cases where such focus detecting or adjusting devices are used for video cameras, TV cameras and the like. This has presented a problem in terms of cost, volume and weight.

A solution has been proposed which utilizes a portion of the image pick-up element for distance or focus detection. In that situation, however, the portion of the image pick-up element which is to be utilized for distance or focus detection is not used for the image pick-up intrinsic function. The image pick-up element thus cannot be used to its full extent for image pick-up. Another shortcoming of this prior art method is that the arrangement of the image pick-up element tends to cause difficulty in arranging an optical system for distance measurement or focal point detection. Furthermore, there is known another method in which a signal for distance measurement or focal point detection is obtained from a video signal. However, the latter method not only has the distance or focus detecting arrangement thereof limited to some specific application but also tends to complicate the circuit arrangement required.

An object of the present invention is to provide an image pick-up device in which an image pick-up element performs a combined function as a light receiving element for distance or focus detection by eliminating the above shortcoming of the arrangement of the prior art and in which the operation of video signal producing means and that of distance or focus detecting means are timely switched over from one to the other permitting reduction in the manufacturing cost, size and weight of the device.

Another object of the invention is to provide an image pick-up device which is not only capable of attaining the above object but is also capable of giving a highly realistic distance or focus detecting area for improved image pick-up, for example, by displaying an image of a projected light spot within an electronic viewfinder.

SUMMARY OF THE INVENTION

To attain these objects, a preferred embodiment of the invention includes an image pick-up element, video signal producing means to process an image pick-up signal from the image pick-up element; focus detecting means including the image pick-up element; and actuating means for actuating the focus detecting means during a different time period from that in which the video signal producing means operates.

In another embodiment of the invention, there are provided, in addition to the above arrangement, a light projecting element for distance or focus detection and means for displaying a light spot image projected by the light projecting element within an electronic viewfinder.

In the image pick-up device according to the invention, the image pick-up element is preferably selected from solid-state image pick-up elements such as a charge coupled device (CCD) element or a MOS image sensor. However, the element may be an image pick-up tube. Furthermore, the above means for actuating the focus detecting means during a time period differing from that during which the video signal producing means operates preferably allows the video signal producing or output means to operate after confirmation of an in-focus condition. More specifically, the operation of the output means immediately begins if the in-focus condition has already been obtained at the start of photographing. If the in-focus condition has not been obtained by that time, the focus detecting means first operates and then the output means operates after the operation of the focus detecting means stops when an in-focus condition is obtained. It is also possible to separately arrange switch-over means switching, as required, the operations of the above two means from one to the other. For stopping the operation of the output means or video signal producing means, the operation of the output means may be either directly or indirectly stopped by stopping the operation of a precedent stage and, thus, to cause the operation of the output means to stop as a result thereof.

The above and further objects and features of the invention will become apparent from the following detailed description of the preferred embodiments thereof taken in conjunction with the accompanying drawings.

DETAILED DESCRIPTION OF THE PREFERRED EMBODIMENT

Figure 1:
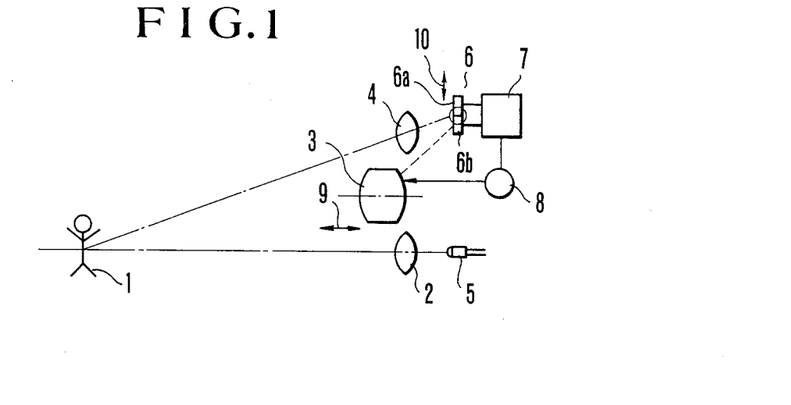
FIG. 1 is a schematic view showing the operating principle of a conventional automatic focusing device of the active type.

Referring to FIG. 1, the reference numeral 1 identifies an object to be photographed. Reference numeral 2 identifies a light projecting lens. A lens group 3 is arranged within a photo-taking lens system to participate in a focusing operation. The lens system is focused on an object 1 located at a shorter distance within the lens group 3 moved to the left in the direction of arrow 9 and on an object 1 located at a greater distance with the lens group 3 moved to the right. There are provided a light receiving lens 4; a light projecting element 5; and a light receiving or light sensitive element 6. The light projecting element 5 is composed of, for example, an infrared ray emitting diode (IRED) or a laser diode (LD) or the like. The light receiving element 6 may be a silicon photo-cell (SPC) and is divided into two regions 6a and 6b.

In the device shown in FIG. 1, distance measurement and focusing are performed in the following sequence. First, the light projecting element 5 forms a light spot image on the surface of the object 1 through the light projecting lens 2. A light flux reflected by the surface of the object 1 forms an image thereof through the light receiving lens 4 on the light receiving element 6, which consists of the two regions 6a and 6b. When the difference between the outputs of the regions 6a and 6b is within a prescribed range, i.e., when the image approximately equally straddles the two regions 6a and 6b as shown in FIG. 1, no signal is transmitted to a motor 8 from a focus adjusting (or focusing) circuit 7. However, when the difference between the outputs of the regions 6a and 6b exceeds the prescribed range, the motor 8 is driven by a signal from the focus adjusting circuit moving the lens group 3 and the light receiving element in a direction which brings the output difference to a value within the prescribed range. In other words, the focus adjusting circuit 7 sends to the motor 8 a signal indicating which of the outputs of the two regions 6a and 6b is greater. Then, the rotation of the motor 8 in the normal or reverse direction moves the lens group 3 either to the left or to the right as indicated by the arrow 9, through a gear train or a rotating cam which is not shown. The light receiving element 6 and the lens group 3 are interlocked with each other by a cam which defines a specific relation between them. The light receiving element 6 is thus moved upward or downward as indicated by an arrow 10 according to the position of the lens group 3. That is, the element 6 moves upward when the lens group 3 moves to the left and moves downward when the lens group 3 moves to the right. The light receiving element 6 thus captures the image of the reflected light flux from the object 1 in the median thereof between the regions 6a and 6b, so that an in-focus condition can always be obtained.

Figure 2:
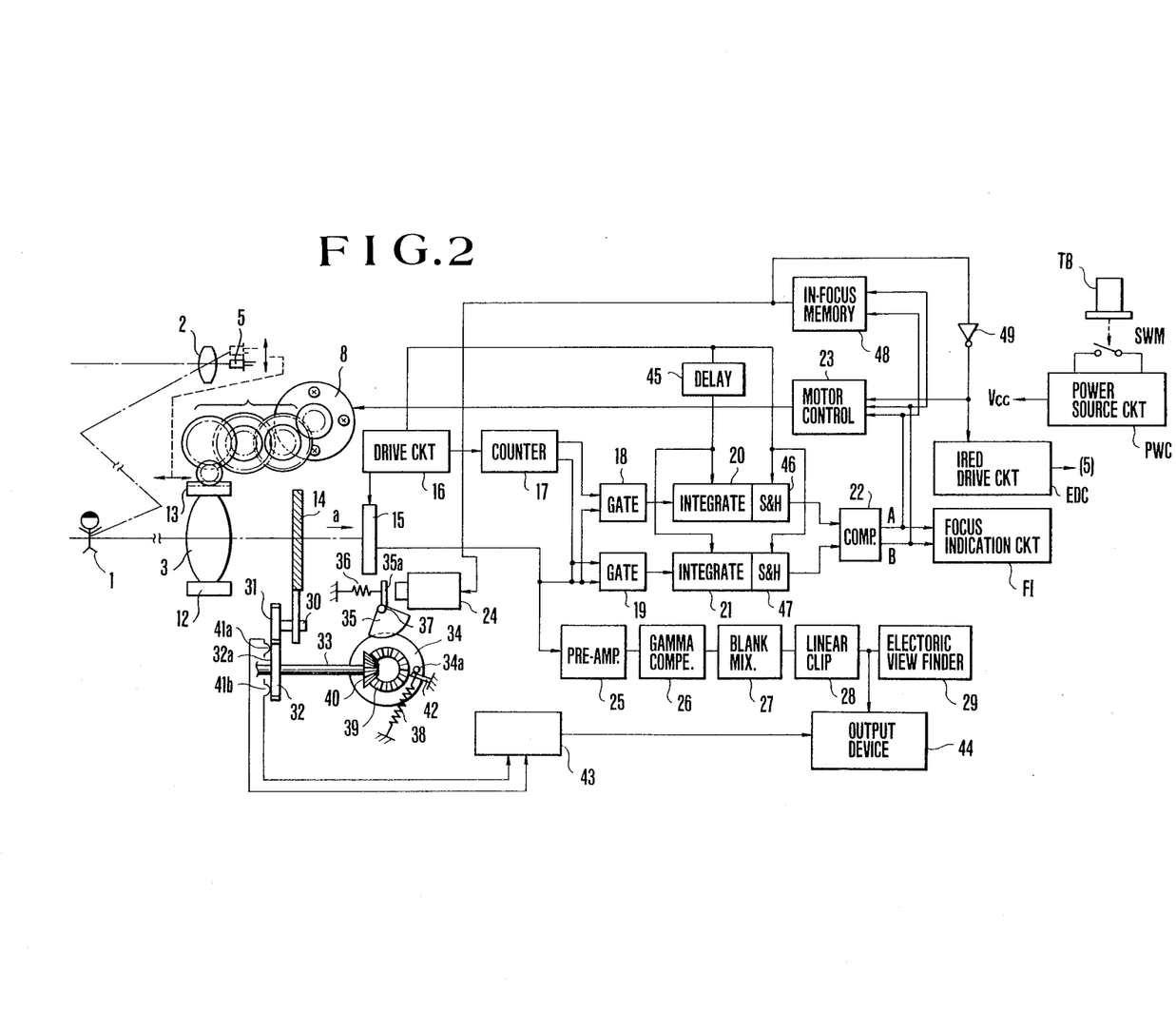
FIG. 2 is a circuit diagram showing the arrangement of an image pick-up device embodying the present invention.
Figure 3:
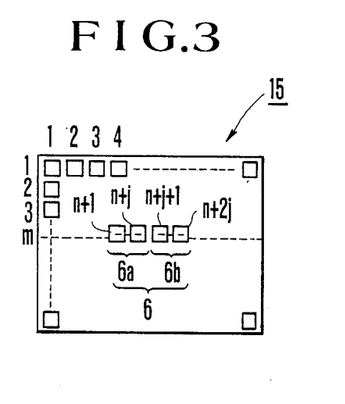
FIG. 3 is a front view showing the image pick-up element of the embodiment as viewed from a direction "a", indicated in FIG. 2.
Figure 4:
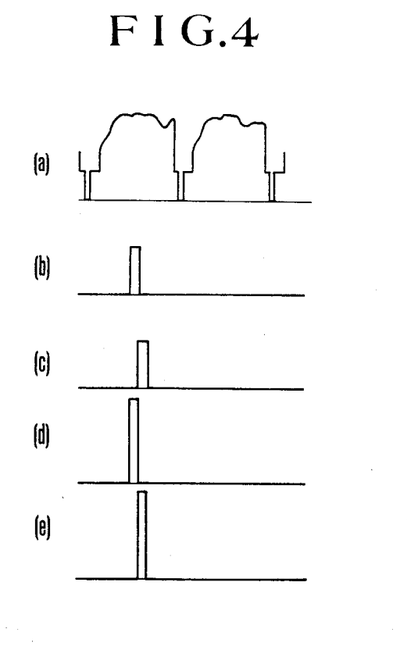
FIG. 4 is an output waveform chart showing the operation of the camera shown in FIG. 2.

An embodiment of the invention where the invention is applied to the automatic focusing device illustrated in FIG. 1 is shown in FIGS. 2 to 5. FIG. 2 shows the image pick-up device which includes an automatic focusing device which operates on the same principle as that shown in FIG. 1. However, while the light receiving element 6 of FIG. 1 moves in an interlocked relation to the lens group 3 which performs a focusing action within the photo-taking lens system, the device of FIG. 2 has an image pick-up element 15 which also functions as a light receiving element for focus detection. Furthermore, in FIG. 2, the function of the light receiving lens 6 of FIG. 1, at least by the lens group 3, performs the focusing action within the photo-taking lens system. In this case, therefore, the light projecting element 2 is movable of the image pick-up element 15. Referring to FIG. 2, the reference numeral 1 identifies the object to be photographed; reference numeral 2 identifies the light projecting lens; the lens group 3 performs a focusing action within a photo-taking system; reference numeral 5 identifies the light projecting element; and reference numeral 8 identifies the motor. These parts generally correspond to the parts shown in FIG. 1. The light projecting element 5 is composed of, for example, the infrared ray emitting diode (IRED) or the laser diode (LD). The light projecting element 5 makes pulse-like light emission at a specific wave length when driven by a light projecting element drive circuit EDC. Generally, this wave length is between 700 and 900 nm. A light flux reflected by the object 1 comes through the lens group 3 and a visible light cut filter 14 forming an image thereof on the image pick-up element 15. The embodiment further includes a gear train 11 which is interlocked with the motor 8; a lens holder 12; and a rack 13 which is on the periphery of the lens holder 12. These parts move the lens group 3 to the left or right, as shown in the drawing, according to normal or reverse rotation of the motor 8 in response to the output of a motor control circuit 23, which will be described later herein. Furthermore, this mechanism for moving the lens group 3 performs an automatic focusing action in a known manner in an interlocked relation with a moving mechanism for the light projecting element 5, for example, through a cam, as conceptionally indicated by a broken line in the drawing. The arrangement and operation of each part of the focusing means or the focus adjusting means shown in FIGS. 2 through 4 are described below.

The image pick-up element 15, shown in FIG. 2 is, for example, a charge coupled device (CCD) element. FIG. 3 shows the image pick-up element 15 as viewed from the direction "a" indicated in FIG. 2. Referring to FIG. 3, the light remaining element 6 takes out a signal required for distance measurement by dividing the signal into the two regions 6a and 6b. However, light receiving element 6 does not differ from other parts of the image pick-up surface of the element 15 either in structure or material. Although a distance measuring signal is taken out from this light receiving element 6 during a focusing operation of the device, a video signal is also read out from the light receiving element 6 during a normal image pick-up operation of the device. This will be further described later herein. The light receiving element 6 is in a position necessary for distance or focus detection within the image pick-up element 15 and in most cases is located in the middle portion of the element 15. The relation of the above regions 6a and 6b to the picture elements within the image pick-up element 15 is as follows.

In FIG. 3, small square parts 1, 2, 3 ... represent the picture elements which are in horizontal and vertical directions. The region 6a consists of picture elements located at points, or addresses n +1 to n +j on a line m in the horizontal direction, while the region 6b consists of picture elements located at points n +j +1 to n +2j on the same line. If necessary, the regions 6a and 6b may consist of a greater number of picture elements also including those located at the addresses corresponding to the above addresses in vertical and transverse alignments on other lines m - p and m +p. However, for the sake of simplification, the following description will be made on the assumption that the regions 6a and 6b are arranged solely on the line m, as shown in FIG. 3.

Again referring to FIG. 2, signals which correspond to the degree of light intensity stored at each of the picture elements on the image pick-up element 15 are read out one after another depending on clock signals coming from a sensor drive circuit 16. The signals thus obtained are converted into a video signal through a pre-amplifier 25, a gamma correction circuit 26, a blanking mixer circuit 27 and a linear clipping circuit 28. The video signal is supplied to an output circuit or device 44. The output circuit or device 44 is controlled by a signal produced from a focusing completion signal producing circuit 43 and performs a further required conversion process on the above video signal before video recording on a magnetic recording tape or disc or transfers the processed video signal to a subsequent circuit. These arrangements are known and therefore no detailed description will be made. The video signal thus obtained is displayed on an electronic viewfinder 29 which includes a CRT displayer, a liquid crystal displayer, and an electro-luminescence displayer or the like. This will be further described later herein.

Signal processing for focus adjustment is carried out in the following manner. The circuit arrangement shown in FIG. 2 includes the sensor drive circuit 16; a counter 17 with decode-out arrangement; analog gates 18 and 19 which respectively receive a decode-out signal from the counter 17 and a signal from the image pick-up element 15; an integrating circuit 20 which is connected to the gate 18; another integrating circuit 21 which is connected to the gate 19; and sample and hold circuits 46 and 47 which are respectively provided for the above integrating circuits 20 and 21. The sample and hold circuits 46 and 47 are controlled by a vertical synchronizing signal produced from the sensor drive circuit 16, the integrating circuits 20 and 21 are reset by a vertical synchronizing signal which is delayed by a delay circuit 45. The outputs of the sample and hold circuits 46 and 47 are compared with each other at a comparison circuit 22. A control circuit 23 controls the motor 8.

The clock signal from the sensor drive circuit 16 is transferred to the counter 17 to give information on the picture element being scanned. Now assuming that the above regions 6a and 6b to which the distance measurement signal is to be applied are at the addresses shown in FIG. 3, the decode output of the counter 17 is adjusted to give a signal obtained from between the addresses n +1 and n +j on the line m of the image pick-up element 15 to the gate 18 and a signal obtained from between the addresses n +j +1 and n +2j of the same line to the gate 19. In other words, the distance measurement signal required for focal point adjustment is obtained from the outputs of the gates 18 and 19. Referring now to FIG. 4, (a) represents a video output between horizontal synchronizing signals; (b) and (c) represent decode outputs of the counter 17; and (d) and (e) respectively represent outputs of the gates 18 and 19.

The outputs of the gates 18 and 19 are respectively integrated at the integrating circuits 20 and 21. Noises are removed from these outputs. Then, these outputs are sample held at the circuits 46 and 47. Meanwhile, the integrating circuits 20 and 21 are reset by the vertical synchronizing signal which is delayed by the above delay circuit 45. The sample and hold circuits 46 and 47, on the other hand, are controlled by the vertical synchronizing signal in such a way as to sample and hold the outputs of the integrating circuits 20 and 21 which are obtained immediately before the integrating circuits 20 and 21 are reset. The outputs of the two sample and hold circuits 46 and 47, that is, the signals of the regions 6a and 6b, shown in FIG. 3, are compared with each other by the comparison circuit 22. Then, according to which is greater, the level of one of the outputs A and B of the comparison circuit 22 becomes high, driving the motor 8 in the normal or reverse direction through the control circuit 23. The motor 8 thus effects focusing as required. Furthermore, at this time, the focusing condition of the lens group 3 is displayed by a focus indication circuit FI which is responsive to the output of the comparison circuit 22.

The circuit arrangement shown in FIG. 2 further includes an in-focus memory circuit 48; an inverter 49; an electromagnet 24; a rotating shaft 30 which is provided for the purpose of retracting the visible light cut filter 14 from an optical path; gears 31 and 32; a rotation shaft 33 connected to the gear 32; another gear 34; a sector gear 35 which engages the gear 34; a spring 36 for the sector gear 35; a rotaton shaft 37 for the sector gear 35; a return spring 38 for the gear 34; a stopper pin 42 which engages a pin 34a provided on the gear 34; a gear 40 which is at the fore end of the shaft 33 to engage another gear 39 which is unified with the gear 34; contact pieces 41a and 41b which contact a printed pattern 32a provided on the surface of the gear 32; and the focusing completion signal circuit 43.

In the above comparison circuit 22, when an in-focus condition is attained with the signal output difference of the above regions 6a and 6b reaching a value within a prescribed range, the output levels A and B of the circuit 22 become low. In response, the in-focus memory circuit 48 memorizes the in-focus condition and applies a signal to the electromagnet 24. The sector gear 35 then rotates clockwise with the arm 35a thereof pulled by the electromagnet 24 against the force of the spring 36. The clockwise rotation of the sector gear 35 rotates the gear 34 counterclockwise against the spring 38. This rotation is transmitted to the rotating shaft 30 via the gears 39 and 40, the shaft 33 and gears 32 and 31. With the rotation of the gear 34 thus transmitted, the visible light cut filter 14 is retracted from the optical path by the shaft 30. Then, if necessary, an infrared ray cut filter, which is not shown, may be inserted into the optical path. Furthermore, at this time, the part between the contact pieces 41a and 41b becomes conductive as these contact pieces 41a and 41b contact the printed pattern 32a on the gear 32. This allows the focusing completion signal producing circuit 43 to confirm the removal of the visible light cut filter 14 and to supply a signal to the output circuit or device 44. The operation of the focusing means then stops and the video signal producing means begins to operate. In the situation where an in-focus condition has already been attained as photographing begins, the electromagnet 24 and parts subsequent thereto operate in the same manner as described above.

When the signal output of the in-focus memory circuit 48 is supplied to the electromagnet 24, this output is inverted by the inverter 49 and is also supplied to the motor control circuit 23 rendering the circuit 23 inoperative. In addition, the driving action of the drive circuit EDC on the light projecting element 5 is also stopped. When the operation of the camera stops to clear the memory circuit 48 thus clearing off the signal supply to the electromagnet 24, the gear 34 is returned by the spring 38 which then moves the gear 34 clockwise until the pin 34a of the gear 34 abuts the stopper pin 42. Then, the filter 14 is, of course, again positioned within the photo-taking optical path. Meanwhile, the sector gear 35 is rotated counterclockwise by the spring 36. The operation of the above focusing means and that of the video signal output means can be switched from one to the other by switch-over means which is arranged separately.

In the image pick-up device shown in FIG. 2, a power supply switch SWM is turned on by means of a trigger button TB. With the power supply switch SWM thus turned on, a power supply circuit PWC effects the power supply to the circuit arrangement of FIG. 2 for operation thereof.

The arrangement of FIG. 2 may be modified, for example, as follows.

The arrangement of FIG. 2 is suited for a camera wherein the projected light spot image 54 is displayed at the electronic viewfinder and an image of a photography object 1 is displayed even during a focusing operation. However, for switching between the operation of the focusing completion signal producing circuit 43 and that of the video signal output means according to the invention, it is also possible to use the signal of the focusing completion signal producing circuit 43 to actuate a circuit which is in front of the output circuit or device 44 for conversion to a video signal in such a way that it effects the switch-over by eventually actuating the output circuit or device 44. With regard to the focusing means, the operation of the focusing means may be stopped, for example, by applying the output of the inverter 49 to the counter 17 or to the gates 18 and 18 to inhibit signal input to the elements arranged subsequent to the gates 18 and 19.

Figure 5:
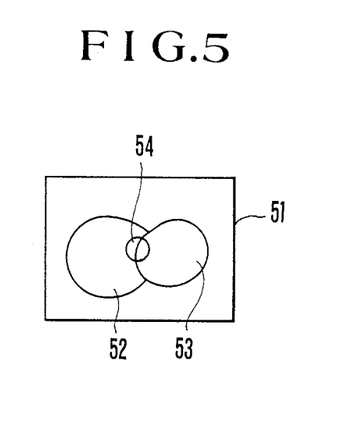
FIG. 5 is an illustration of a display made within a viewfinder of the camera in FIG. 2.

In accordance with the arrangement of FIG. 2, a picture image can be confirmed at the electronic viewfinder 29 even with the visible light cut filter 14 in the optical path although this results in deterioration of picture quality. Besides, the realistic distance or focus detecting position in the object 1 field can be found by direct observation of projected light spot image 54, so that the picture-taking would be improved for an object with interfering objects of different distances. Referring to FIG. 5, let us assume that a reference numeral 51 identifies a whole visual field and that matters 52 and 53, which greatly differ from each other either in distance or in reflection factor, are located as shown in FIG. 5. In such a case, an automatic focusing device of the active trigonometrical measurement type tends to make distance measurement errors. However, such distance measurement errors can be prevented with the projected light spot image 54 displayed directly at the electronic viewfinder 29.

In the device described above, a portion of the image pick-up element 15 is utilized as a light receiving element for focus detection and the focusing means operates within a time period differing from that during which the video signal output means is allowed to operate. This arrangement deletes the necessity of separately providing a light receiving element 6. This not only permits reduction in the manufacturing cost, size and weight of the device but also permits adoption of the TTL (through the lens) method in which focus detection is carried out by a light flux passing through a photo-taking lens system, so that distance measurement can be accomplished in the middle of a picture. Besides, since the projected light spot image 54 can be displayed directly at the viewfinder 29, erroneous distance measurement can be prevented resulting in improved pictures for an object with interfering objects of different distances.

Figure 6:
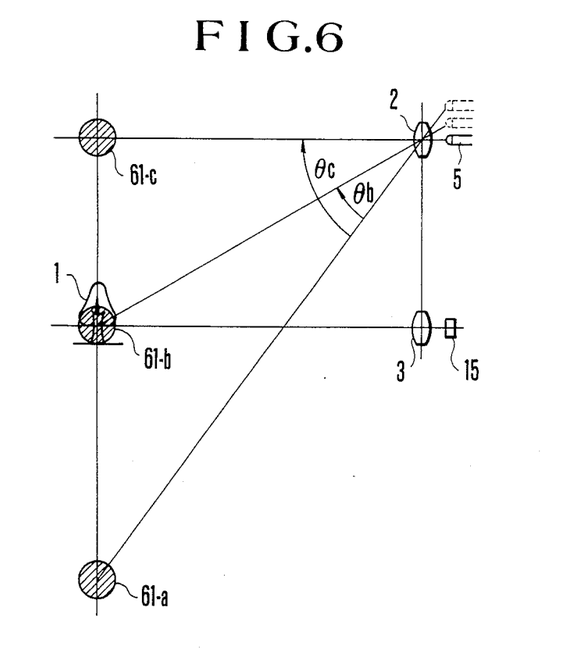
FIG. 6 is a schematic view showing a focusing device which is applicable to the invented image pick-up device in another embodiment.

The image pick-up device of the present invention is also applicable to automatic focusing devices of various kinds other than the automatic focusing device shown in FIGS. 2, 3 and 4. One example of this is shown in FIG. 6. The light projecting element 5 scans beforehand from a point 61-a to a point 61-c. When the output of the image pick-up element 15 which also serves as a light receiving element reaches a peak, the scanning angle $\theta b$ is detected finding the distance to the object and accordingly performs a focusing operation. Since a peak value detecting method is employed in this case, the portion of the image pick-up element 15 to be used for distance measurement does not have to be divided into the two regions 6a and 6b. Like the first embodiment which has been described in the foregoing, this embodiment can also be operated in accordance with the TTL method and distance measurement can be carried out in the center of the picture.

Figures 7, 8:
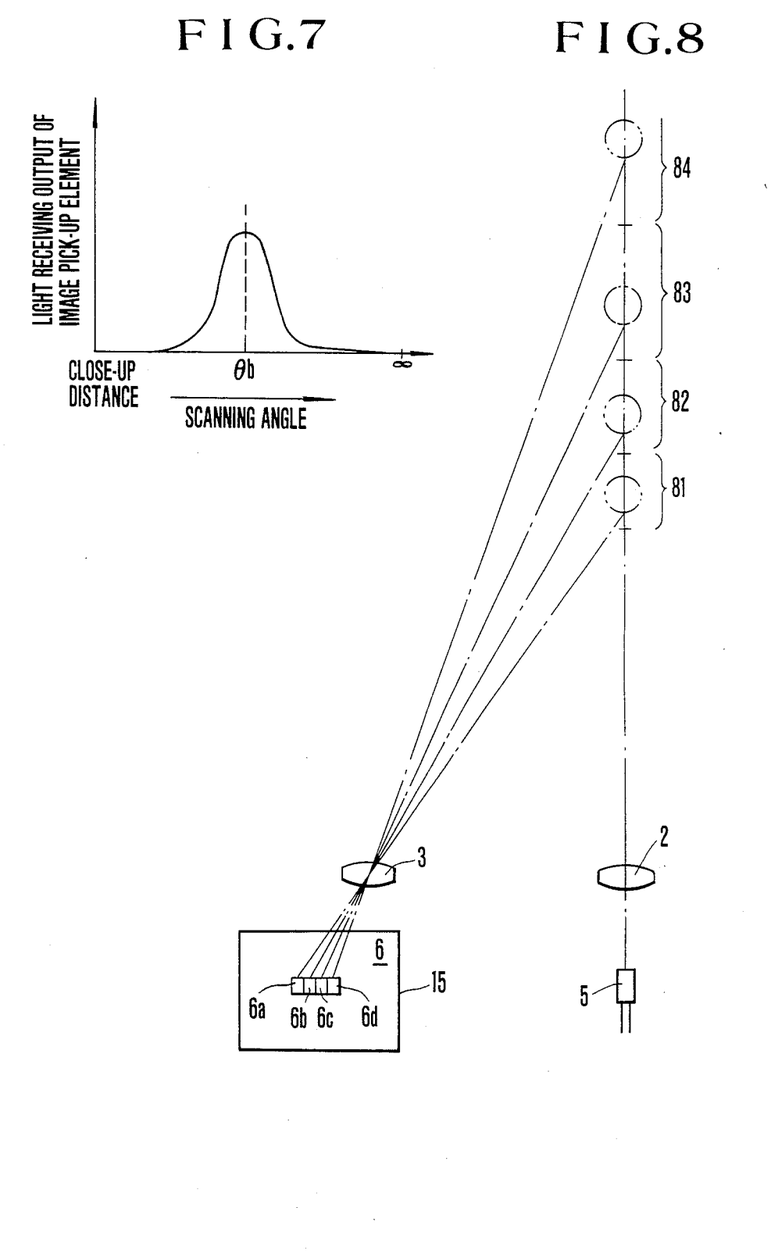
FIG. 7 is a graphical representation of the operation of the device of FIG. 6.
FIG. 8 is a schematic view showing another embodiment of the focusing device applicable to the image pick-up device according to the invention.

In another embodiment which is shown in FIG. 8, the image pick-up element 15 which also serves as the light receiving element is arranged as follows. The portion 6 which is to be used for distance measurement is divided into a number of regions 6a, 6b, 6c, 6d, . . . corresponding to the same number of distance zones 81, 82, 83, 84, . . . of the field depth. These regions 6a, 6b, 6c, 6d, . . . are laterally aligned. The distance to the object 1 to be photographed is detected for focusing by finding one of the regions at which a reflected light returns with the greatest intensity. A feature of this embodiment is that it requires no moving part for focusing.

While the invention has been described as applied to image pick-up devices having automatic focusing devices of the active type, the invention is not limited to that type but is also applicable to image pick-up devices having automatic focusing devices of the passive type and to image pick-up devices having manual focusing devices.

In accordance with the invention, as has been described in the foregoing, the image pick-up element 15 also serves as a light receiving element for distance or focus detection. The focusing means or focus adjusting means operates during a time period which differs from that during which the output means for a video signal is operating. The invention, therefore, permits reduction in manufacturing cost, size and weight of the image pick-up device without any adverse effect on the focus adjusting function.

Furthermore, another advantage is that a highly realistic distance focus detecting point can be observed as the image of light projected by the light projecting element 2 is directly displayed at the electronic view finder 29. This eliminates the fear of erroneous distance measurement and permits improvement in picture-taking for an object with interfering objects of different distances.

The image pick-up device according to the invention is applicable not only to cameras of various types such as a video camera and a TV camera but also to image handling systems requiring focus adjustment such as read-out devices used for facsimile equipments, copying machines, etc.

What I claim:

1. An image pick-up device comprising:
   (A) focus adjustable image forming lens means for forming an image of an object;
   (B) image pick-up means arranged to receive the object image formed by said lens means and to produce an electrical signal indicative of the picked up image;
   (C) image signal handling means receptive of the signal produced by said pick-up means;
   (D) focus detecting means receptive of the signal produced by said pick-up means and detecting the focusing condition of said lens means on the basis of the received signal; and
   (E) control means for alternatively enabling said focus detecting means and said signal handling means; and
   wherein said focus detecting means produces a characteristic indication upon detecting an in-focus state of said lens means relative to the object, and wherein said control means enables said signal handling means, while disabling said focus detecting means, on the basis of said characteristic indication.

2. A device according to claim 1, wherein said control means includes a memory circuit for memorizing the in-focus state of the lens means in response to said characteristic indication.

3. A device according to claim 1, further comprising:
   focus indicating means coupled to said focus detecting means for indicating the focusing condition of the lens means on the basis of the focus detection result of the detecting means.

4. A device according to claim 1, wherein said signal handling means includes video output means for putting out a video signal.

5. A device according to claim 1, wherein said signal handling means includes video recording means for recording a video signal.

6. An image pick-up device comprising:
   (A) focus adjustable image forming lens means for forming an image of an object;
   (B) image pick-up means arranged to receive the object image formed by said lens means and to produce an electrical signal indicative of the picked up image;
   (C) image signal handling means receptive of the signal produced by said pick-up means;
   (D) focus detecting means receptive of the signal produced by said pick-up means and detecting the focusing condition of said lens means on the basis of the received signal; and
   (E) focus adjusting means responsive to the detection output of said focus detecting means for adjusting the focus of said lens means; and
   (F) control means for alternatively enabling said focus detecting means and said signal handling means; and
   wherein said focus detecting means produces a characteristic indication upon detecting an in-focus state of said lens means relative to the object, and wherein said control means enables said signal handling means, while disabling said focus adjusting means, on the basis of said characteristic indication.

7. A device according to claim 6, wherein said control means includes a memory circuit for memorizing the in-focus state of the lens means in response to said characteristic indication.

8. A device according to claim 6, further comprising:
   focus indicating means coupled to said focus detecting means for indicating the focusing condition of the lens means on the basis of the focus detection output of the detecting means.

9. A device according to claim 6, wherein said signal handling means includes video output means for putting out a video signal.

10. A device according to claim 6, wherein said signal handling means includes video recording means for recording a video signal.

11. A camera comprising:
    (A) focus adjustable image forming lens means for forming an image of an object;
    (B) image pick-up means arranged to receive the object image formed by said lens means and to produce an electrical signal indicative of the picked up image;
    (C) image signal handling means receptive of the signal produced by said pick-up means;
    (D) radiation projecting means for projecting a beam of radiation toward the object so that the radiation reflected by the object impinges upon said pick-up means through said lens means;
    (E) focus detecting means for detecting the focusing condition of said lens means relative to the object on the basis of the signal obtained from a portion of said pick-up means, which portion is adapted for receiving said reflected radiation; and
    (F) control means for alternatively enabling said focus detecting means and said signal handling means; and
    wherein said focus detecting means produces a characteristic indication upon detecting an in-focus state of said lens means relative to the object, and wherein said control means enables said signal handling means, while disabling said focus detecting means, on the basis of said characteristic indication.

12. A camera according to claim 11, wherein said control means is arranged to disable said projecting means at least when enabling said signal handling means.

13. A camera according to claim 11, wherein said control means includes a memory circuit for memorizing the in-focus state of the lens means in response to said characteristic indication.

14. A camera according to claim 11, wherein said signal handling means includes video output means for putting out a video signal.

15. A camera according to claim 11, wherein said signal handling means includes video recording means for recording a video signal.

16. A camera according to claim 11, further comprising:

display means for displaying the image picked up by said pick-up means on the basis of the signal produced by the pick-up means.

17. A camera comprising:

(A) focus adjustable image forming lens means for forming an image of an object;

(B) image pick-up means arranged to receive the object image formed by said lens means and to produce an electrical signal indicative of the picked up image;

(C) image signal handling means receptive of the signal produced by said pick-up means;

(D) radiation projecting means for projecting a beam of radiation toward the object so that the radiation reflected by the object impinges upon said pick-up means through said lens means;

(E) focus detecting means for detecting the focusing condition of said lens means relative to the object on the basis of the signal obtained from a portion of said pick-up means, which portion is adapted for receiving said reflected radiation, said detecting means producing a detection output indicative of the focusing condition of the lens means;

(F) focus adjusting means responsive to the detection output of said focus detecting means for adjusting the focus of said lens means; and (G) control means for alternatively enabling said focus adjusting means and said signal handling means; and wherein said focus detecting means produces a characteristic indication upon detecting an in-focus state of said lens means relative to the object, and wherein said control means enables said signal handling means, while disabling said focus adjusting means, on the basis of said characteristic indication.

18. A camera according to claim 17, wherein said control means is arranged to disable said projecting means at least when enabling said signal handling means.

19. A camera according to claim 17, wherein said control means includes a memory circuit for memorizing the in-focus state of the lens means in response to said characteristic indication.

20. A camera according to claim 17, wherein said signal handling means includes video output means for putting out a video signal.

21. A camera according to claim 17, wherein said signal handling means includes video recording means for recording a video signal.

22. A camera according to claim 17, further comprising:

display means for displaying the image picked up by said pick-up means on the basis of the signal produced by the pick-up means.

* * * * *